United States Patent [19]

Bellussi

[11] 3,903,969
[45] Sept. 9, 1975

[54] CLAMPING AND RELEASING DEVICE FOR ROTARY HOES AND THE LIKE

[76] Inventor: Angelo Bellussi, Cavalcaselle, Verona, Italy

[22] Filed: Feb. 22, 1974

[21] Appl. No.: 444,879

[30] Foreign Application Priority Data
Mar. 8, 1973   Italy................................. 21324/73

[52] U.S. Cl. ...................... 172/5; 172/38; 172/235
[51] Int. Cl.² ................... A01B 63/00; A01B 13/06
[58] Field of Search.................. 172/5, 38, 233–235; 56/10.4

[56] References Cited
UNITED STATES PATENTS
2,206,283   7/1940   Jacobs et al. .................... 172/38 X
3,095,045   6/1963   Ennis et al. .................... 172/235 X
3,117,632   1/1964   Caggiano ...................... 172/233 X FOREIGN PATENTS OR APPLICATIONS
2,062,771   7/1971   Germany
900,255     7/1962   United Kingdom.................. 172/5

Primary Examiner—Stephen C. Pellegrino
Attorney, Agent, or Firm—Steinberg & Blake

[57] ABSTRACT

Clamping and releasing device for agriculteral machines having a set of rotary tools for soil works, carried on at least one support capable of being rotated by the dynamic torque resulting from the rotation of the tools inserted in the soil when the support is released from a stationary part, wherein the release of the rotable support is provided by at least one rotating cam acting on a latch when a member associated with the latch is inserted on the path for the active portion of the cam.

9 Claims, 10 Drawing Figures 3,903,969

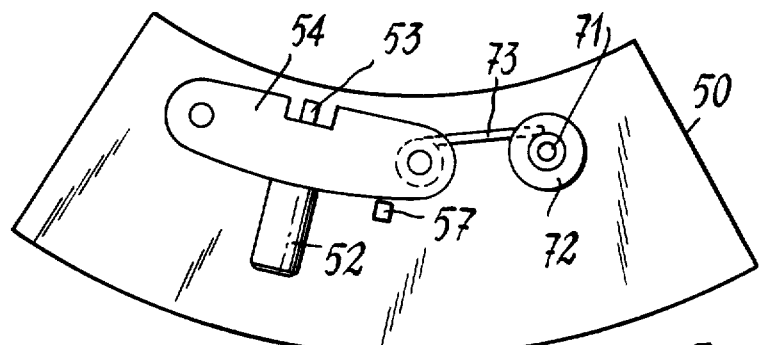
Fig. 5
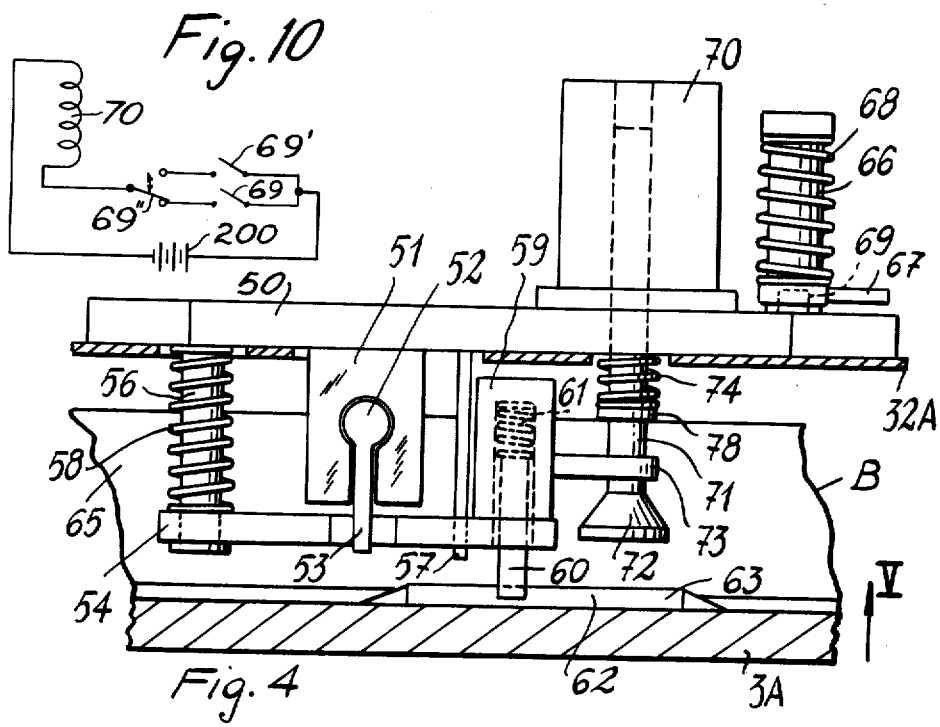
Fig. 10
Fig. 4

CLAMPING AND RELEASING DEVICE FOR ROTARY HOES AND THE LIKE

This invention relates to a clamping and releasing device for rotary hoes and similar agricultural apparatus. Particularly, but not exclusively, the device according to the invention is mainly used in hoes or similar agricultural apparatus, carried by an arm laterally cantilever extending from a tractor and provided with a set of rotating tools, operated through shaft and wheelworks by the tractor power take-off and supported by a framework capable of rotating relative to a stationary support attached to the arm when a sensor, on encountering an obstacle, will remove a latch holding the framework coupled to the support, enabling the framework to rotate, and thus the tools to step over the obstacle. Particularly, the latch fast with the stationary support and movable by the sensor will engage stops located at regular intervals from one another and carried by the framework.

For example, an apparatus of the above design is described in the issued German Pat. application No. 2,062,771 and in the Italian Pat. No. 883,004.

The clamping and releasing mechanism of the rotary framework, which mechanism comprises the sensor, latch, mechanical connection between the sensor and latch, and stops located at regular intervals from one another and cooperating with said latch, suffers from substantial disadvantages.

The main disadvantage is to be found in its poor sensitivity, not enabling the rotation of the rotating framework when the sensor contacts a very thin flexible tree, thereby destroying or damaging the tree. Moreover, it does not allow to clamp the rotating framework at suitable positions intermediate to those for completing the stepping over cycle of the trees (120° as indicated in the exemplary case of the above mentioned pubblications).

It is the main object of a device according to the invention to prevent the sensor from not operating at the right time because of the tree trunk bending, causing the tools to interfere with the tree trunk, which would result in damaging or destroying the tree itself.

It is another important object of the invention to allow the movable toolholder framework to stop at a position of non-interference with the row of trees when the sensor is bent due to contacting a tree and as long as the contact lasts. Thus, it often occurs that the trunk is distorted or inclined, or that a plurality of trees are close to one another, therefore it being necessary for the safety of said trees that the machine should not work the zone thereat.

According to the invention, a clamping and releasing device for farm machines having a set of rotating tools for soil works, carried by at least one rotable framework capable of being rotated by the dynamic torque resulting from the rotation of the tools inserted in the soil when said framework is released from a stationary support, is characterized in that the release of the rotable framework is provided by at least one rotary cam acting on the latch, when a member associated with the latter is inserted on the path for the active portion of the cam.

The invention will be better understood from the following detailed description given by mere way of not limiting example for preferred embodiments thereof, as shown in the accompanying drawings in which:

FIG. 4 is a schematic fragmentary sectional view taken along line IV—IV of FIG. 1;

FIG. 5 is a view on a different scale in the direction of arrow V in FIG. 4 with a part omitted;

FIG. 10 is a schematic wiring diagram of electrical controls according to one embodiment of the invention.

The device according to the invention is exemplarily applied to a farm implement, such as hoe, described in the above mentioned German Pat. No. 2,062,771.

Figure 1:
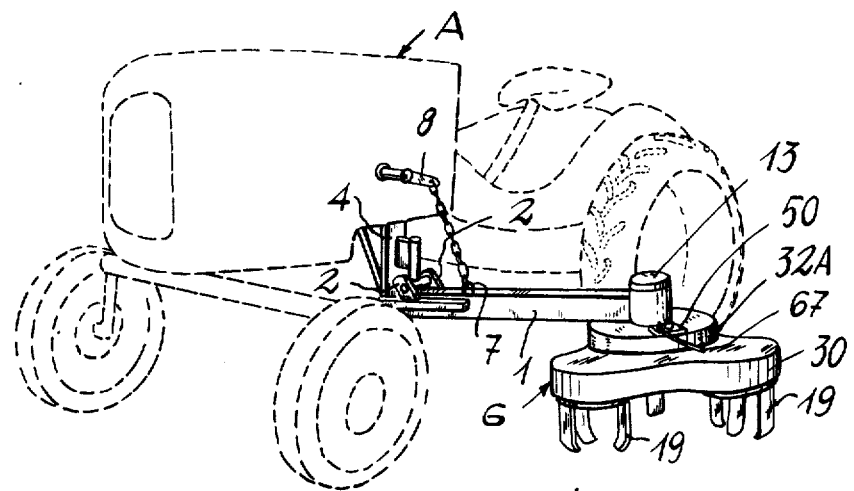
FIG. 1 is a schematic perspective view of a hoe carried by a tractor which is shown by broken lines, except for the hoe supporting and lifting means.
Figure 2:
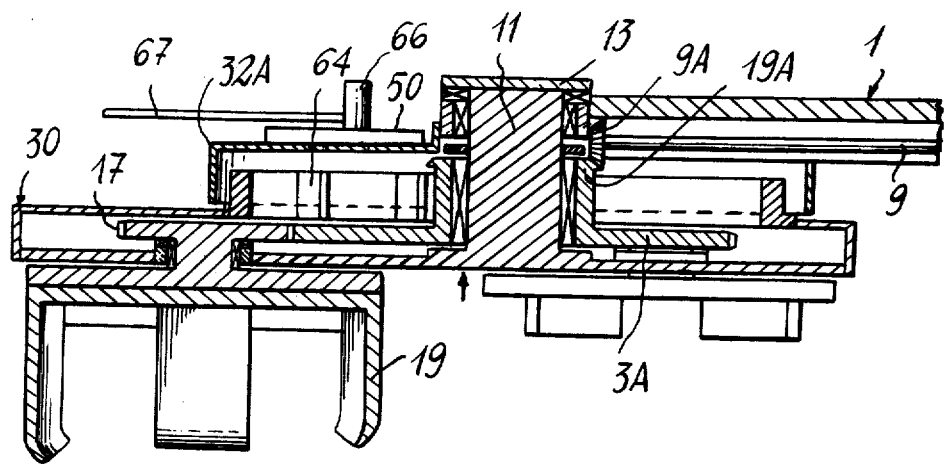
FIG. 2 is a diagrammatic vertical sectional view showing the hoe, with some parts having been omitted for clarity.
Figure 3:
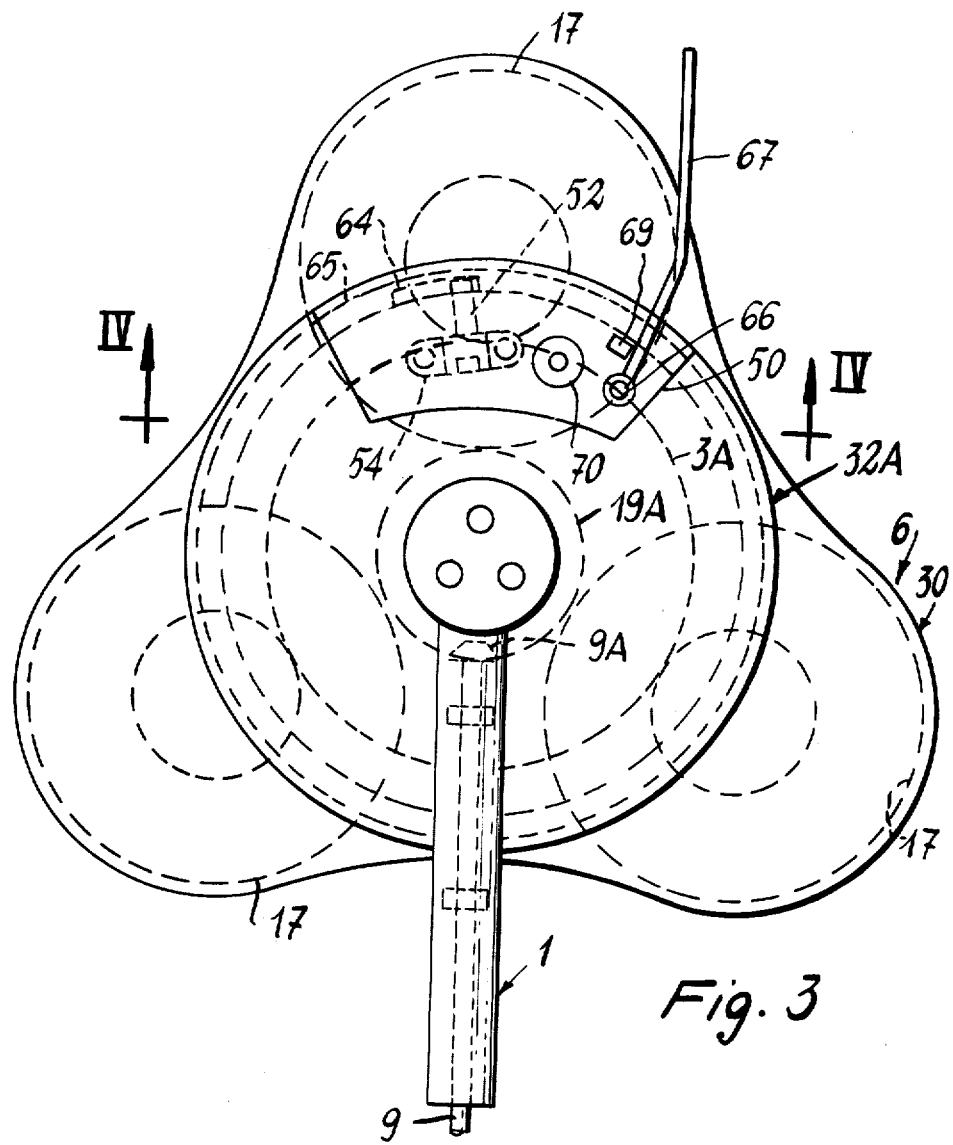
FIG. 3 is a diagrammatic plan view of the hoe embodying the device according to the present invention.
Figure 6:
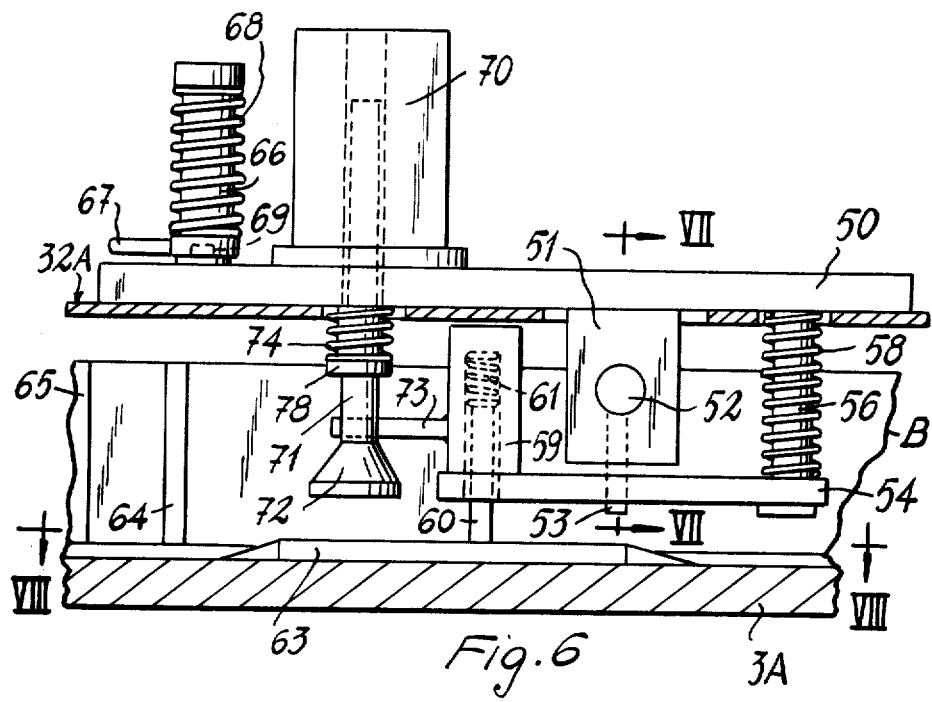
FIG. 6 is a view taken on the opposite side of FIG. 4.

Referring to FIGS. 1 and 2 of the drawings, a hoe G is laterally cantilever connected to a tractor A through an arm 1. By a fork 2, said arm 1 is pivoted to a support 4 secured to the tractor. At an intermediate location of arm 1, a chain 7 is secured and terminates at an arm 8 of the conventional hydraulic lifting system provided on the tractor.

The conventional tractor power take-off drives a shaft 9 extending along said arm 1 and terminating in a bevel gear 9A meshing with a bevel gear 19A fast with a gear wheel 3A. The gear wheels are carried on a pin 11 of a rotable framework 30 carrying three rotating tools 19 at 120° to one another, the tools being driven by the wheel 3A through gear wheels 17. The pin 11 is rotably carried on a stationary bearing 32A and provided with a top resisting plate 13.

Referring also to the other figures of the drawings, a plate 50 is attached to the stationary bearing 32A.

The plate 50 has welded thereto a bored block 51, in which a locking bar 52 is slidably mounted and provided with a downward facing extension 53, on which an arm 54 can operate.

Figure 7:
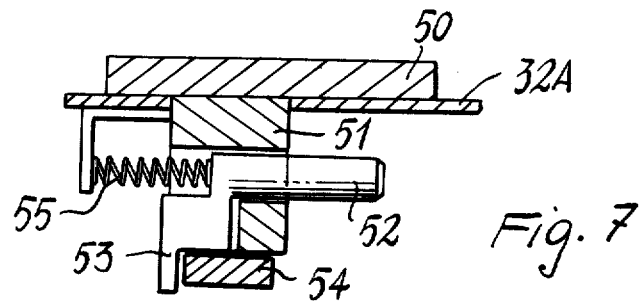
FIG. 7 is a schematic sectional view taken along line VII—VII of FIG. 6.

The locking bar 52 is loaded by a spring 55 tending to move it to clamping position (to the right as seen in FIG. 7).

The arm 54 is pivoted to the bottom end of a pin 56 secured to plate 50 and is biased to rotate against a stop 57 by a torsion spring 58 coaxial with said pin 56.

At its free end, said arm 54 carries a bored cylinder 59, a pin 60 loaded by a spring 61 sliding therein. Under certain angular positions of arm 54, the bottom end of pin 60 can engage the side contour 62 of a cam 63 secured on the upper face of the gear wheel 3A driven by the pair of bevel gears 19A, 9A. Thus, the cam 63 can rotate the whole arm 54 and hence also the locking bar 52, causing the latter to dislodge from one of the locking notches 64 formed in a steel ring 65 fast with the movable framework 30. Three of such notches are provided and evenly spaced apart from one another, alternately located relative to further three notches 64' (also evenly spaced apart from one another) designed for internally locking said framework 30.

The plate 50 carries a pin 66, to which a sensing arm 67 is pivoted. A torsion spring 68 is concentrically mounted on said pin, tending to retain the sensor against a stop (not shown).

Said plate 50 also carries a switch 69 located on the path of sensor 67. This switch 69, actuated by the sensor after a determined rotation of the latter, will energize an electromagnet 70 carried on said plate 50. The moving core of this electromagnet 70 is associated with a pin 71 terminating at the bottom with a frusto-conical extension 72 which, as the electromagnet is energized, will interfer with a finger 73 fast with said cylinder 59, causing said arm 54 to rotate.

Figure 8:
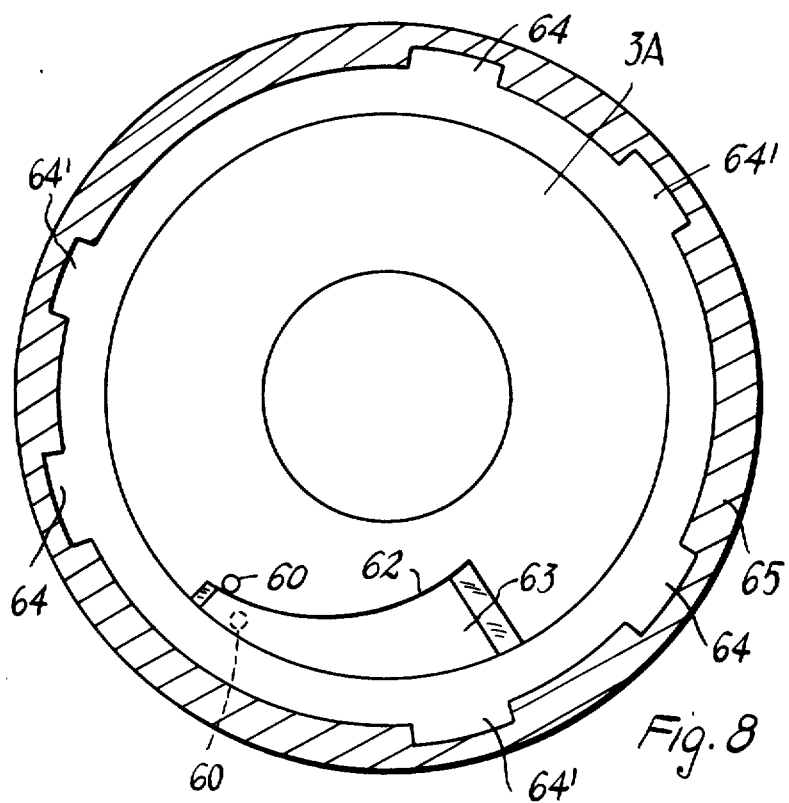
FIG. 8 is a sectional view taken along line VIII—VIII of FIG. 6.

It should be noted that, when the electromagnet 70 is de-energized, the pin 60 does not cooperate with the side contour 62 of the cam 63, but instead slides on the top surface of cam 63 (see pin 60 shown by broken lines in FIG. 8), being aided to this purpose by the inclined configuration of the end surface regions of said cam 63 and the axial movability of pin 60.

It should also be noted that said switch 69 can have a control member (the sensor 67 acting thereon) of a sufficient extension that the switch will remain closed for some fraction of the angular excursion of said sensor 67.

The operation of the device is as follows.

On striking against a tree trunk, the sensor 67 will rotate and in the first portion of its rotation close the switch 69 to energize the electromagnet 70. As a result, the extension 72 will raise against a spring 74 (carried on pin 71 and resisting against a collar 78) and laterally move the arm 54 through said finger 73.

The sidewise movement of arm 54 will bring the pin 60 to such a position as to cooperate with the side face 62 of cam 63 (this cam is secured at the periphery of said gear wheel 3A, extends through a given angle and its side face 62 curves in close to the center of said wheel). The face 62 further displaces the pin 60 and hence the arm 54 which, by acting on the extension 53, causes the locking bar 52 to move out of the notch 64, in which it was inserted.

The dynamic torque resulting from the rotation of the tools inserted in the soil, is then capable of rotating the entire movable framework 30 of the hoe which is clamped again by the locking bar 52 at the immediately next intermediate stop notch 64'. Thus, as soon as released from the cam 63, said arm 54 and locking bar 52 urged by springs 58 and 55, respectively, will readily move back to the starting position. This occurs when the sensor 67 is still bent beyond the operating angle for the switch 69, and hence with the electromagnet 70 at de-energized condition.

When, after stepping over the obstacle, the sensor 67 is in the last fraction of the back rotation effective again on said switch 69, the above described same procedure is repeated, at the end thereof the only difference being that the locking bar 52 will insert in a notch 64 for the normal working position of the implement.

In the embodiment shown, it is contemplated that the sensor 67 would cause the energization of the electromagnet 70, the latter providing for the release operation which, however, is accomplished by the cam 63. It is apparent that other solutions are within the scope of the invention, such as the use of mechanical or hydraulic means instead of the electromagnet.

In the case of a mechanical means, the sensor 67 would during its angular excursion lift the pin 71 and associated extension 72. To this end, an end of the sensor could be provided with a roller for cooperation with an inclined plane applied to the top of pin 71. Where the hydraulic solution is adopted, the sensor could operate on a valve connected in a hydraulic circuit, having therein a cylinder housing a piston which is associated with said pin 71. Furthermore, it is also within the scope of the invention to dispense with the sensor 67, and instead to use a manual switch controlled by the operator and positioned, for example, on the tractor dashboard to energize the electromagnet 70, or a mechanical connection may be operable by the operator to start the rotation of the movable support, or a hydraulic control may be actuated by the operator for such a rotation.

Moreover, the electromagnet 70 could be selectively controlled by the sensor, as described, or by the operator through an electrical contact, the change from one to the other control being provided through a change-over switch. Thus, as may be seen from FIG. 10, the electromagnet 70 is connected through a change-over switch 69'' to a pair of parallel connected switches 69 and 69' which in turn are connected through the battery 200 of the vehicle back to the electromagnet 70. The switch 69 is controlled by way of the sensor 67 in the manner described above, while the switch 69' is available together with the change-over switch 69'' to the operator for actuation by the operator. When the switch 69'' is displaced to its other contact from the contact shown in FIG. 10 then it is possible for the operator to control the electromagnet 70 manually by the switch 69'.

Figure 9:
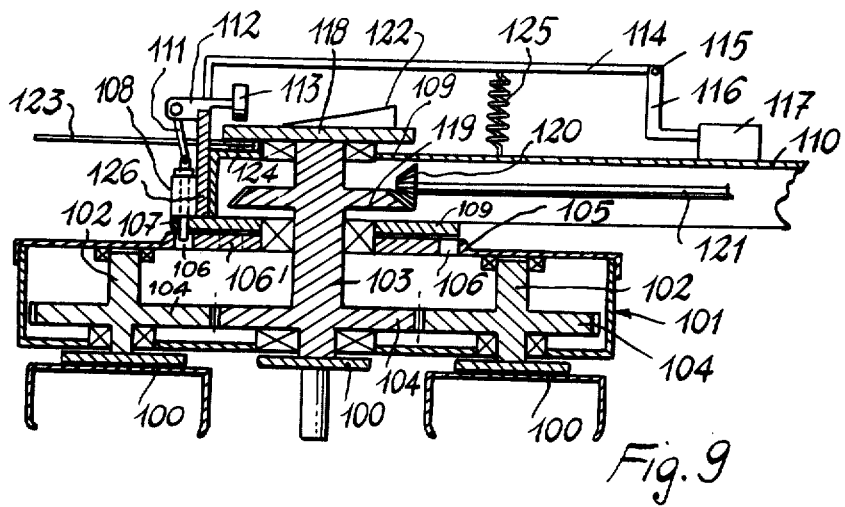
FIG. 9 is a schematic side elevational view showing a different embodiment of the invention as applied to a rotary hoe provided with aligned tools.

Referring to FIG. 9, the hoe shown therein comprises three aligned tools 100, rotably carried in the framework 101 on shafts 102 and 103 interconnected by gear wheels 104. The framework 101 is carried on the central shaft 103 for rotation and at the top has a plate 105 provided with two sets of holes 106 and 106'.

The illustrated set of holes 106 comprises two holes 180° from each other. The same is true for the other set of holes 106' that are angularly spaced apart relative to holes 106. Only one hole 106' is shown in dotted lines in FIG. 9. These holes correspond to the notches 64 and 64' of the previous embodiment. A latch 107 is slidably mounted in a guide 108 secured to stationary support 109 which is carried by an arm 110 connected to the tractor. The latch is coupled through a connecting rod 111 to a body 112 cantilever carrying an idler roller 113. This body 112 is fixed with an arm 114 pivoted at 115 to a crank 116 fast with the moving core of an electromagnet 117 carried by said arm 110.

The shaft 103 is rotatably carried also by the stationary support 109, shaft 103 having at the top a plate 118 and at intermediate position a bevel gear 119 meshing with a bevel gear 120 carried by a shaft 121 connected to the tractor power take-off. At the top, said plate 118 carries a cam 122 which is of an arcuate configuration extending along a circle whose center is in the axis of the shaft 103, this cam 122 normally being situated at a different radial distance from the latter axis than the roller 113 so that in the position of the parts shown in FIG. 9 there will normally be no engagement between the cam 122 and the roller 113. When the electromagnet 117 is energized, said roller 113 is shifted into the path of movement of cam 122 and rides up the cam to dislodge the latch 107 from the hole 106, thereby allowing the rotation of the framework 101.

The energizing is provided by the usual sensing rod 123 acting on an electrical contact 124, similarly to the first embodiment. A spring 125 is provided for holding the roller 113 against the cam 122 and, at the deenergized condition of electromagnet 117, the body 112 against a stationary stop member 126.

Thus, it will be seen that with the structure of the invention the various gears which drive the tools which work the soil form a drive means for driving the soil-working tools, this drive means being carried by a frame means such as the frame means 30 or the frame means 101. A support means is provided to support the frame means and the drive means carried thereby for swinging movement in response to the reaction between the tools and the soil, this support means including the arm 1 or the arm 110. The support means carries a latch means which in its latching position cooperates with the frame means to prevent swinging of the latter with respect to the support means. Thus, the element 52 cooperates with a notch 64 of the frame means 30 to form a latch means normally preventing swinging of the frame means 30 with respect to the support means 1, and in the same way the latch pin 107 cooperates normally with one of the holes 106 to prevent swinging of the frame means 101 with respect to the support means 110. Thus, the latch means normally has a latching position latching the frame means with respect to the support means. A latch-release means is operatively connected with the latch means and is adapted to be acted upon by a rotary cam means for acting on the latch means to displace the latter to a release position releasing the frame means for the above swinging movement with respect to the support means, the latch-release means normally having a position beyond the operating range of the cam means which is driven by the drive means. Thus, the pin 60 is normally beyond the operating range of the cam 63, which is to stay out of engagement with the camming surface 62 thereof, and the release means formed by the roller 113 is normally beyond the range of the rotary cam 122 which forms the cam means for actuating the release means 113. A positioning means is provided for positioning the latch-release means in a position where it is in the operating range of the cam means, this positioning means being formed by the electromagnet 70 together with the elements 71 and 72 as well as by the electromagnet 117 together with the components 114–116 connected thereto. Thus when the positioning means 70 or 117 is actuated it will displace the latch-release means 60 or 113 into the operating range of the cam means 63 or 122, respectively, so that now these rotary cams when driven by the drive means will act on the latch-release means to displace the latch means to a release position releasing the frame means for swinging movement with respect to the support means in response to the reaction between tools and the soil. Thus, the positioning means can be actuated automatically by way of a sensor means 67 which acts through the switch 69 on the electromagnet 70, this sensor means also taking the form of the element 123 which acts on the switch 124 in order to energize the positioning means formed by the electromagnet 117. However, the positioning means formed by the electromagnet 117. However, the positioning means can be manually actuated by manual closing of a switch, in accordance with the particular position of a change-over switch as described above and shown in FIG. 10. Moreover, when the cam means moves beyond the latch-release means, the latch means will first act to latch the frame means in a non-operative position, at this time the pin 52 being in one of the notches 64' and the pin 107 being in one of the holes 106', and it is only when the latch means is again released by way of the positioning means which again positions the latch-release means in the operating range of the cam means that the frame means is capable of swinging back to its normal operating position with respect to the support means with the latch means now returning, after movement of the cam means beyond the latch-release means, to its normal position with respect to the frame means maintaining the latter latched in its normal operating position with respect to the support means.

What I claim is:

1. In a machine for working the soil, drive means for driving soil-working tools, frame means carrying said drive means, support means supporting said frame means for swinging movement with respect to said support means in response to a reaction between driven tools and the soil worked thereby, latch means carried by said support means and having a latching position cooperating with said frame means for preventing swinging thereof with respect to said support means, latch-release means operatively connected with said drive means to be driven thereby, said cam means acting on said latch-release means when the latter is an operating range of said cam means for displacing said latch means to a release position releasing said frame means for swinging movement with respect to said support means for avoiding a collision with an obstacle, and positioning means operatively connected with said latch-release means for positioning the latter in the operating range of said cam means prior to collision with the obstacle.

2. The combination of claim 1 and wherein said positioning means is manually operable to be actuated by an operator of the machine when a collision is anticipated.

3. The combination of claim 1 and wherein a sensing means for sensing the presence of an obstacle is operatively connected with said positioning means for actuating the latter automatically to position said latch-release means in the operating range of said cam means.

4. The combination of claim 3 and wherein said positioning means is electrical and said sensing means is operatively connected with said positioning means for electrically energizing the latter, manually operable switch means connected with said electrical positioning means for manually energizing the latter, and change-over switch means electrically connected with said sensing means and said manually operable switch means for rendering either said manually operable switch means operative or said sensing means operative at the option of an operator of the vehicle.

5. The combination of claim 1 and wherein said latch means includes a latch pin and a portion of said frame means formed with a space which receives said latch pin, said latch means including a spring normally urging said latch pin into said space, said latch-release means including a lever for displacing said latch pin out of said space, and a cam follower operatively connected with said lever to be acted upon by said cam means when said cam follower is in said operating range thereof, said positioning means acting on said lever for initially turning the latter through an initial increment sufficient to displace said cam follower into the operating range of said cam means.

6. The combination of claim 5 and wherein said cam follower is a pin which is carried by said lever and said cam means being driven in rotation by said drive means and having a side camming surface into the range of which said pin of said latch-release means is displaced by said positioning means.

7. The combination of claim 5 and wherein said cam follower is a roller and said positioning means initially acting on said lever to displace the latter through an initial increment placing said roller in the operating range of said cam means, the latter having an inclined surface which acts on said roller to displace said latch pin out of said space.

8. The combination of claim 6 and wherein said frame means is formed with at least one additional space which receives said latch pin after said frame means swings with respect to said support means to avoid collision with an obstacle, and said positioning means being operative a second time to place said latch-release means in the operating range of said cam means for displacing said latch pin from said additional space to return said frame means to a position corresponding to its initial position with respect to said support means.

9. The combination of claim 8 and wherein said frame means is formed with a first plurality of spaces for respectively receiving said latch pin when said frame means is in any one of a number of normal operating positions with respect to said support means and with a second plurality of spaces respectively alternating with said first plurality of spaces for respectively receiving said latch pin when said frame means is in any one of a number of positions to which said frame means swings in order to avoid collision with an obstacle.

* * * * *